(12) United States Patent
Manka (10) Patent No.: US 11,814,328 B2
(45) Date of Patent: Nov. 14, 2023

(54) ROTTING METHOD AND DEVICE FOR AN ORGANIC MATERIAL

(71) Applicant: Christoph Manka, Bonn (DE)

(72) Inventor: Christoph Manka, Bonn (DE)

(73) Assignee: Christoph Manka, Bonn (DE)

( * ) Notice: Subject to any disclaimer, the term of this patent is extended or adjusted under 35 U.S.C. 154(b) by 300 days.

(21) Appl. No.: 16/915,864

(22) Filed: Jun. 29, 2020

(65) Prior Publication Data

US 2021/0403391 A1    Dec. 30, 2021

(51) Int. Cl.
| | |
|---|---|
| *C05F 17/929* | (2020.01) |
| *C05F 17/70* | (2020.01) |
| *C05F 17/60* | (2020.01) |
| *C05F 17/05* | (2020.01) |

(52) U.S. Cl.
CPC ............ *C05F 17/929* (2020.01); *C05F 17/60* (2020.01); *C05F 17/70* (2020.01); *C05F 17/05* (2020.01)

(58) Field of Classification Search
CPC ........ C05F 17/929; C05F 17/60; C05F 17/70; C05F 17/15; C05F 17/90; Y02P 20/145; Y02W 30/40
See application file for complete search history.

(56) References Cited

U.S. PATENT DOCUMENTS

| | | | |
|---|---|---|---|
| 3,041,148 A | 6/1962 | Ballantyne et al. | |
| 5,451,523 A * | 9/1995 | Von Fahnestock | C05F 17/90 435/286.7 |
| 5,981,270 A * | 11/1999 | Roberts | C05F 17/70 435/290.3 |
| 2010/0112632 A1 | 5/2010 | DeWaard | |
| 2012/0196357 A1 | 8/2012 | Smith-Sebasto | |

FOREIGN PATENT DOCUMENTS

| | | |
|---|---|---|
| EP | 0685441 | 12/1995 |
| FR | 2953827 | 6/2011 |
| WO | 1994029014 | 12/1994 |
| WO | 2002020428 | 3/2002 |

OTHER PUBLICATIONS

Bidlingmaier, W. "Biological Waste Treatment: Unit 5, Composting Techniques" Projekt Orbit. Bauhaus Universitat Weimar. 2016 (Year: 2016).*
Cornell Composting. "Compost Physics" Science & Engineering. < https://compost.css.cornell.edu/physics.html> Jun. 25, 2016 (Year: 2016).*
Extended European Search Report for U.S. Appl. No. 18/000,997, dated Jun. 5, 2019.

* cited by examiner

*Primary Examiner* — Jennifer A Smith
(74) *Attorney, Agent, or Firm* — Burris Law, PLLC (57) ABSTRACT

A method for rotting an organic material includes at least partially controlling a rotting device with a control unit and feeding an organic material into a pivoted rotting chamber of the rotting device, having the organic material rotted in the rotting chamber for a rotting time, turning the rotting chamber by a chamber drive unit of the rotting device, and exhausting the rotted organic material from the rotting chamber after the rotting time. A device for rotting the organic material includes a pivoted rotting chamber for enclosing the organic material. The rotting chamber has a port and a cover associated with the port for opening and closing the port, a chamber drive unit configured to turn the rotting chamber, and a control unit connected to the chamber drive unit and configured to operate the chamber drive unit.

8 Claims, 6 Drawing Sheets

ROTTING METHOD AND DEVICE FOR AN ORGANIC MATERIAL

FIELD

The present disclosure relates to a method for rotting an organic material and to a device for rotting an organic material.

BACKGROUND

The statements in this section merely provide background information related to the present disclosure and may not constitute prior art.

Organic material may be rotted in a process which commonly is also called composted. Rotting is a metabolic process carried out by a large number of microorganisms which may be summarized as microbes. The microbes comprise single-cell organisms like bacteria as well as organisms having few cells like fungi.

In nature, the rotting process is carried out by microorganisms usually living in or on the soil. Rotting is not limited to the soil however. An adequate population of microbes either is already present in an organic material to be rotted or may be artificially inferred or added to an organic material to be rotted.

The rotting process being a biological process, an adequate rotting time is needed for finishing the rotting process up to a predetermined result. The rotting time depends on a plurality of conditions which include a temperature of the organic material, a density and/or diversity of the microbes within the organic material, an oxygen concentration within the organic material, a humidity (i.e., water content) of the organic material and a pH value, i.e., an acidity or a basicity, of the organic material.

Accordingly, these conditions may be varied, improved, and possibly optimized, in order to increase a rotting efficiency of the rotting process, i.e. reduce a rotting time, and improve a quality of the rotted organic material, i.e. obtain a predetermined rotting result.

Depending on the population of microbes the rotting process may be partially aerobic, i.e. consuming oxygen, and partially anaerobic, i.e. not consuming any oxygen. Indeed, in some variations the rotting process is mostly aerobic. A ratio between aerobic rotting and anaerobic rotting mainly depends on the organic material itself and the population of microbes therein on the one hand and environmental conditions, particularly the temperature of and the oxygen concentration within the organic material, on the other hand. Thereby, it has to be taken into account that rotting, as every metabolic process does, generates heat increasing the temperature of the organic material.

Different methods are known in the art for initiating and supporting a rotting process in an industrial context. Such methods include heap composting, tunnel composting, container composting and drum composting. However, many industrially applicable methods are difficult to control and/or do not reliably provide a satisfactory efficiency or result. EP 0 685 441 A1, for instance, discloses a traveling rotting device, i.e. a rotting device mounted to a vehicle, for drum composting an organic material.

SUMMARY

This section provides a general summary of the disclosure and is not a comprehensive disclosure of its full scope or all of its features.

In one form of the present disclosure a method for rotting an organic material is provided. The method comprises the following steps to be at least partially controlled by a control unit of a rotting device:

feeding an organic material into a pivoted rotting chamber of the rotting device, having the organic material rotted in the rotting chamber for a rotting time, turning the rotting chamber by a chamber drive unit of the rotting device during the rotting time and exhausting the rotted organic material from the rotting chamber after the rotting time.

The rotting conditions may be best controlled when the organic material to be rotted is enclosed within a housing which hereinafter is called a rotting chamber. The chamber drive is arranged and configured to turn the rotting chamber and may comprise a motor and one or more gears.

Turning the rotting chamber causes circulation of the organic material within the rotting chamber. The circulation intermixes the organic material and homogenizes the rotting conditions within the organic material thus allowing the rotting process to be carried out all over the rotting chamber as uniformly as possible.

Apart from that, the circulation inhibits or prevents a gradual compression of the organic material due to a gravity direction being constant for a long time. In a compressed portion of the organic material a concentration of oxygen would be gradually reduced. Lack of oxygen suppresses the activity of aerobic microbes and, at the same time, supports the activity of anaerobic microbes. Anaerobic metabolism, however, generates more heat than aerobic metabolism, thus further increasing the temperature of the organic material. As aerobic microbes suffer from high temperatures being present for a certain time, the quality of the rotted organic material deteriorates which is undesirable. The circulation of the organic material supports an adequate concentration of oxygen within the organic material which is needed by aerobic microbes and, thus, helps keeping the temperature of the organic material in an aerobic range.

A lack of oxygen may be additionally inhibited or prevented by providing a coarse organic material which due to its consistency comprises a plurality of cavities supporting a permanent distribution of oxygen throughout the organic material.

Rotting methods which are based on a rotting chamber feed the organic material into the rotting chamber and, when the rotting process has finished, exhausting the rotted organic material from the rotting chamber. Accordingly, the rotting chamber has a feeding/exhausting opening which is called a port herein. The rotting chamber further has a sealing means for closing the rotting chamber and inhibiting or preventing the organic material from exiting the rotting chamber while the rotting chamber is turned. It is known to provide the sealing means as a pair of pivotable flaps to be manually operated, see for example EP 0 685 441 A1 cited above.

Preferably, the control unit operates a cover drive unit of the rotting device for feeding and exhausting the organic material, the cover drive unit traveling back and forth a cover of the rotting chamber thus opening and closing a port of the rotting chamber. Shortly summarized, the control unit automatically opens and closes the port of the rotting chamber. This very basic automation essentially allows for automating the rotting method to an even higher degree.

In another form of the present disclosure a method for rotting an organic material comprises a step of having the organic material rotted in a pivoted rotting chamber of a rotting device for a rotting time. As mentioned above, it is the adequate rotting time which allows the microbes for finishing their metabolic work.

Preferably a control unit operates a chamber drive unit of the rotting device alternately halting and turning the rotting chamber during the rotting time. In other words, during the rotting time there are both halting phases and turning phases the duration of which is controlled by the control unit. While any turning phase provides a circulation of the organic material, the circulation being favorable for the above mentioned reasons, any halting phase provides spatially stationary rotting conditions. Spatially stationary rotting conditions are particularly appreciated by fungi. Fungi are essentially hindered from contributing to the rotting process of the organic material as long as the organic material is circulating.

The rotting chamber advantageously may be halted for a halting time in a range from 1 hour to 2 hours and preferably for a time of 1.5 hours. Halting times within this range are favorable for most of the fungi.

Additionally or alternatively, the rotting chamber may be turned by a turning angle in a range from 225° to 315° and preferably by a turning angle of 270° during a turning time. The turning angle is different from 360° as a full rotation would reestablish the position of the rotting chamber before the rotation. A turning angle in the given range substantially corresponds to three quarters of a full rotation. This is sufficient for an efficient circulation of the organic material. The turning time depends on the chamber drive unit and may vary.

In some variations, the rotting chamber is turned by a turning angle in a range from 45° to 135° and preferably by a turning angle of 90° when a temperature of the organic material measured by a temperature sensor associated to and arranged within the rotting chamber exceeds 70° C. A temperature above 70° C. is most probable caused by a strong metabolism of the anaerobic microbes. In order to strengthen the metabolism of the aerobic microbes the rotting chamber is intermediately turned by about a quarter of a full rotation in order to increase an oxygen concentration within the organic material.

Additionally or alternatively, the organic material may be exhausted from the rotting chamber when a temperature of the organic material measured by a temperature sensor associated to and arranged within the rotting chamber has reached a peak of 70° C. once and stayed at a temperature in a range from 55° C. to 65° C. and preferably at a temperature of 60° C. for at least an hour after having reached the peak temperature of 70° C. This temperature profile is typical for a successful completion of the rotting process. The rotted organic material does not stay in the rotting chamber longer than the rotting time in order to inhibit or prevent a deterioration of the rotting result on the one hand and to free the rotting chamber for a subsequent use as soon as possible. The latter effect contributes to the efficiency of the rotting method.

In some variations the rotting chamber is automatically fed via a feeding line of a feeding unit and/or that the rotting chamber is automatically exhausted via an exhausting line of an exhausting unit. Automatic feeding and exhausting further increases the degree of automation of the rotting method.

In at least one variation, the rotting chamber may be fed when the port of the rotting chamber faces in a direction opposite to gravity. The organic material is supplied to the rotting chamber by gravity. In other words, the organic material to be fed simply falls into the rotting chamber.

Additionally or alternatively, the rotting chamber may be exhausted when the port of the rotting chamber faces in a gravity direction. The organic material is extracted from the rotting chamber by gravity. In other words, the organic material to be exhausted simply falls out of the rotting chamber.

In still another form of the present disclosure, a rotting device for an organic material is provided. The rotting device has a pivoted rotting chamber for enclosing an organic material, the rotting chamber having a port and a cover for opening and closing the port, a chamber drive unit configured to turn the rotting chamber and a control unit connected to the chamber drive unit and configured to control the chamber drive unit. The rotting device may be used for drum composting.

Preferably, the rotting device has a cover drive unit being connected to the control unit and being configured to automatically travel the cover for feeding and exhausting an organic material. The cover drive unit allows for automatically opening and closing the port and, thus, allowing for an additional automation.

Advantageously, each rotting chamber has a volume of at least 4 m$^3$. The efficiency of the rotting process considerably increases when the volume of the organic material in the rotting chamber exceeds the indicated limit. In other words, an organic material having a volume of 4 m$^3$ or more may often be rotted considerably more efficiently than an organic material having a volume below 4 m$^3$.

In some variations, that the rotting device has at least one pivoted cylindric rotting container, the rotting container having a plurality of angular segments, particularly four angular segments, separated from each other by a perforated segment wall, respectively, each segment forming a rotting chamber. Thus, a plurality of rotting chambers may be pooled to form a very symmetric container allowing for a simple chamber drive unit. Apart from that, this container design supports rotting of separate charges of organic material which, at the same time, may be at different stages of the rotting process. Accordingly, each rotting chamber may be fed and exhausted independently of any other rotting chamber, i.e. the rotting container may be fed and exhausted partly and step by step. The perforations formed in the segment walls allow the microbes to be exchanged between the rotting chambers in a peripheral direction further increasing the rotting efficiency of the rotting device. The segmented walls may have zig-zag structures or steps for providing a larger exchange surface.

The angular segments may advantageously span identical peripheral angles and have identical volumes. The configuration of the rotting chambers results in a very high symmetry of the rotting container which allows for identical ports and covers around the rotting container.

The rotting device may ideally have a plurality of rotting containers juxta positioned in an axial direction, detachably connected to each other and separated from each other by a perforated container wall extending perpendicular to the axial direction. The rotting device is axially elongated to provide a large rotting volume. The perforations formed in the segment walls allow the microbes to be exchanged between the rotting chambers in an axial direction further increasing the rotting efficiency of the rotting device. The segmented walls may have zig-zag structures or steps for providing a larger exchange surface.

In some variations the rotting device has a platform directly or indirectly supporting each rotting container. The platform provides one or more rotational bearings and may have legs for supporting the platform against a solid ground. The skilled person appreciates the rotting device to be also mountable onto a vehicle.

In at least one variation the rotting device has a feeding unit, the feeding unit being connected to and controlled by the control unit and having a feeding line and/or a feeding funnel, the feeding line being controlled by the control unit and being configured as a screw conveyor or as a belt conveyor. The feeding unit allows for a higher degree of device automation.

Additionally or alternatively, the rotting device has an exhausting unit, the exhausting unit being connected to and controlled by the control unit and having an exhausting line, the exhausting line being configured as a screw conveyor or as a belt conveyor. The exhausting unit allows for a higher degree of device automation.

In some variations the rotting device has a plurality of temperature sensors, humidity sensors, oxygen sensors and/or pH sensors, each sensor being connected to the control unit and associated to and arranged within a rotting chamber. The plurality of sensors monitor the most desired rotting parameters in order to have appropriate measures been taken by the control unit when a monitored rotting parameter exits an optimal range or takes a detrimental value exceeding a predefined maximum.

It is a desired advantage of the method and the device according to the teachings of the present disclosure that handling the rotting process is very easy. The high degree of automation in combination with a plurality of rotting chambers particularly supports handling different charges of organic material independently and still in communication on a microbial level. Another advantage arises in form of a high rotting efficiency and a high quality of the rotted material. Apart from that, the performance of the rotting device may be scaled due to its modular structure by simply varying the number of containers.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
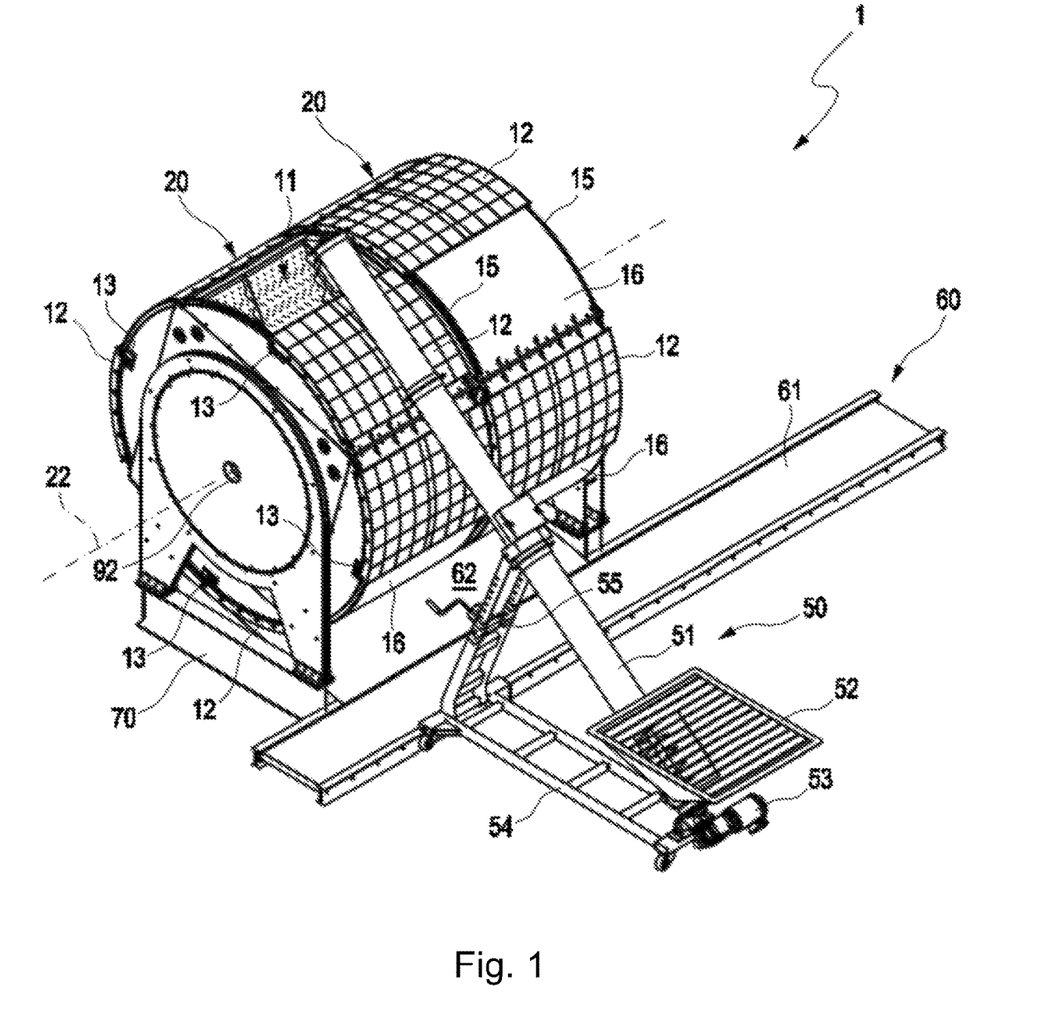
FIG. 1 schematically shows a perspective view of a rotting device according to one form of the present disclosure.

FIG. 1 schematically shows a perspective view of a rotting device 1 for an organic material according to one form of the present disclosure. The rotting device 1 has two pivoted cylindric rotting containers 20. The rotting containers 20 are juxta positioned in an axial direction 22 defined by a rotational axis and are detachably connected to each other, preferably by means of a plurality of screws. The rotting containers 20 are axially separated from each other by a perforated container wall 21 (FIG. 4) extending perpendicular to the axial direction 22 and allowing for passing of microbes in an axial direction.

Each rotting container 20 has four angular segments being separated from each other by a perforated segment wall 14 allowing for passing of microbes in a peripheral direction. Each segment forms a pivoted rotting chamber 10 (FIG. 4) for enclosing an organic material. The angular segments may span identical peripheral angles and may have identical volumes wherein each rotting chamber 10 has a volume of at least 4 cubic meters ($m^3$). Each rotting chamber 10 also has a peripheral cylindric wall 16, a port 11 formed therein (e.g., a rectangular opening) and a corresponding traveling cover 12 (e.g., a rectangular cover) for selectively opening and closing the port 11.

The rotting device 1 has eight cover drive units 13 each being associated to one of the eight covers 12. The cover drive units 13 are each configured to travel or move the associated cover 12 back and forth along a pair of arc-shaped rails 15 arranged at axially opposite sides of the respective rotting chamber 10 or rotting container 20 for feeding an organic material into the associated rotting chamber 10 and exhausting an organic material from the associated rotting chamber 10, respectively. Thus, the eight cover drive units 13 allow for independently opening and closing each port 11.

The rotting device 1 further has a chamber drive unit 30 (FIG. 5) which is configured to turn the rotting containers 20 and, at the same time, the rotting chambers 10 formed therein.

Furthermore, the rotting device 1 may have a feeding unit 50. The feeding unit 50 preferably has a feeding line 51 for transporting an organic material, the feeding line 51 being configured as a screw conveyor, a feeding funnel 52 for supplying the organic material to the feeding line 51, a feeding line drive unit 53 being associated to the feeding line 51 and configured to operate the feeding line 51, a slope adjusting unit 55 being associated with the feeding line 51 for adjusting a slope thereof and a rack 54 supporting the feeding line 51, the feeding funnel 52, the feeding line drive unit 53 and the slope adjusting unit 55. The feeding unit 50 is axially displaceable along the containers 20.

The rotting device 1 further may have an exhausting unit 60. The exhausting unit 60 preferably has an exhausting line 61 for transporting a rotted organic material, the exhausting line 61 extending beside the rotting containers 20 and being configured as a belt conveyor, a chute 62 for guiding the organic material exiting a rotting chamber 10 to the exhausting line 61 and an exhausting line drive unit 63 (FIG. 2) being associated with the exhausting line 61 and configured to operate the exhausting line 61. The exhausting line 61 also guides the displaceable feeding unit 50.

Moreover, the rotting device 1 has a platform 70 which supports each rotting container 20 on a surface (e.g., the ground) directly or indirectly, i.e., by means of a juxtapositioned rotting container 20. The rotting device 1 may alternatively be attached to a vehicle by means of the platform 70.

Figure 2:
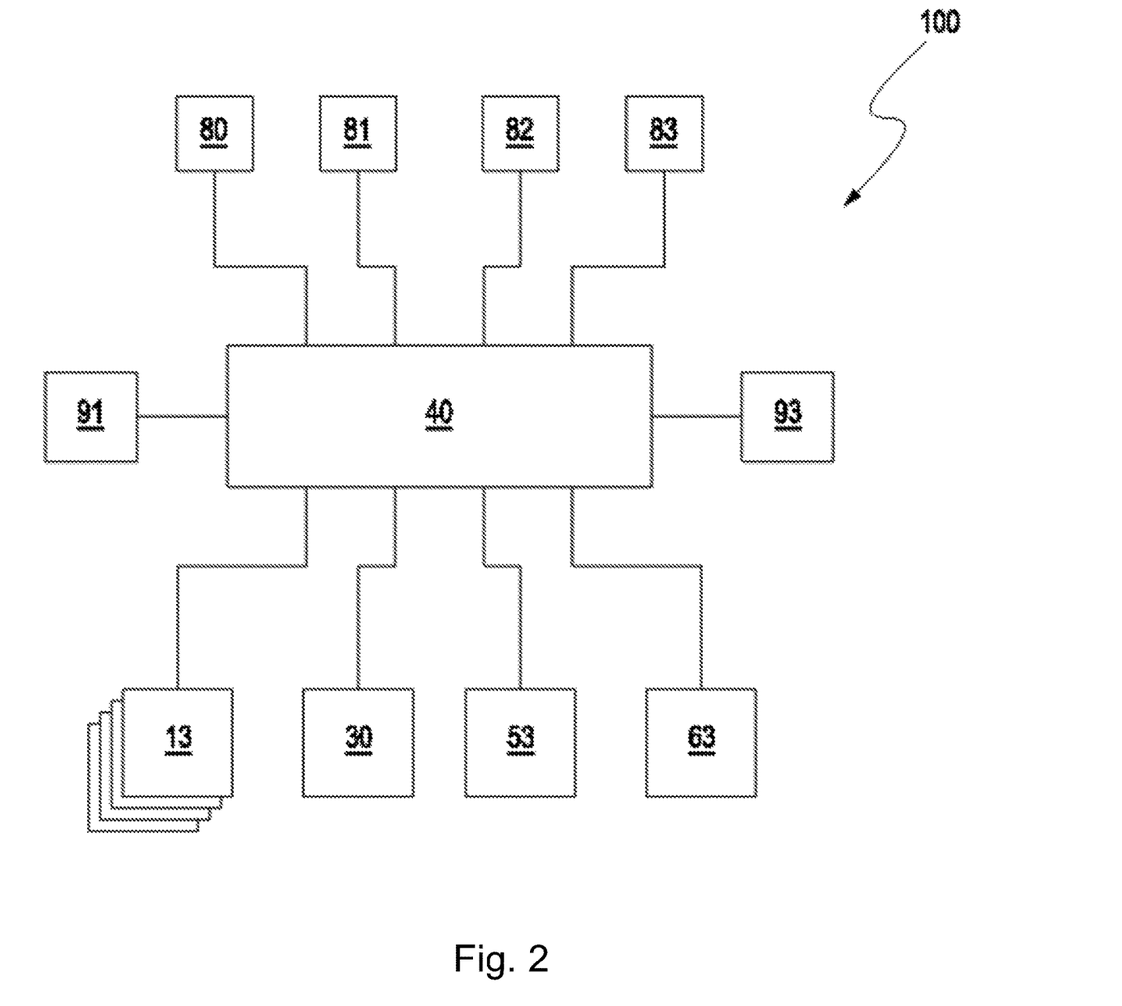
FIG. 2 schematically shows a block diagram of a circuitry of the rotting device shown in FIG. 1.

The rotting device 1 may also have a plurality of sensors, i.e. temperature sensors 80, humidity sensors 81, oxygen sensors 82 and/or pH sensors 83 (FIG. 2). Each sensor 80, 81, 82, 83 is preferably associated with and arranged within a rotting chamber 10.

Furthermore, the rotting device 1 may have a water supply unit 91 (FIG. 2) and a water conduit 90 (FIG. 6) connected to the water supply unit 91. Additionally, the rotting device 1 may have an air supply unit 93 (FIG. 2) and an air conduit 92 being connected to the air supply unit 93. The skilled person may freely choose any water supply unit and air supply unit available in the art, respectively. In some variations, the rotting device 1 has a central control unit 40 (FIG. 2).

Referring to FIG. 2, a block diagram is shown for a circuitry 100 of the rotting device 1 in FIG. 1. Each sensor 80, 81, 82, 83 is operatively connected to the control unit 40. The control unit 40 is in turn operatively connected to each cover drive unit 13, the chamber drive unit 30, the feeding line drive unit 53, the exhausting line drive unit 63, the water supply unit 91 and the air supply unit 93. The control unit 40 is configured to control, and in some variations automatically operate, each cover drive unit 13, the chamber drive unit 30, the feeding line drive unit 53, the exhausting line drive unit 63, the water supply unit 91 and the air supply unit 93 according to a predetermined rotting program and particularly dependent on a signal received from a temperature sensor 80, humidity sensor 81, oxygen sensor 82 and/or pH sensor 83.

Figure 3:
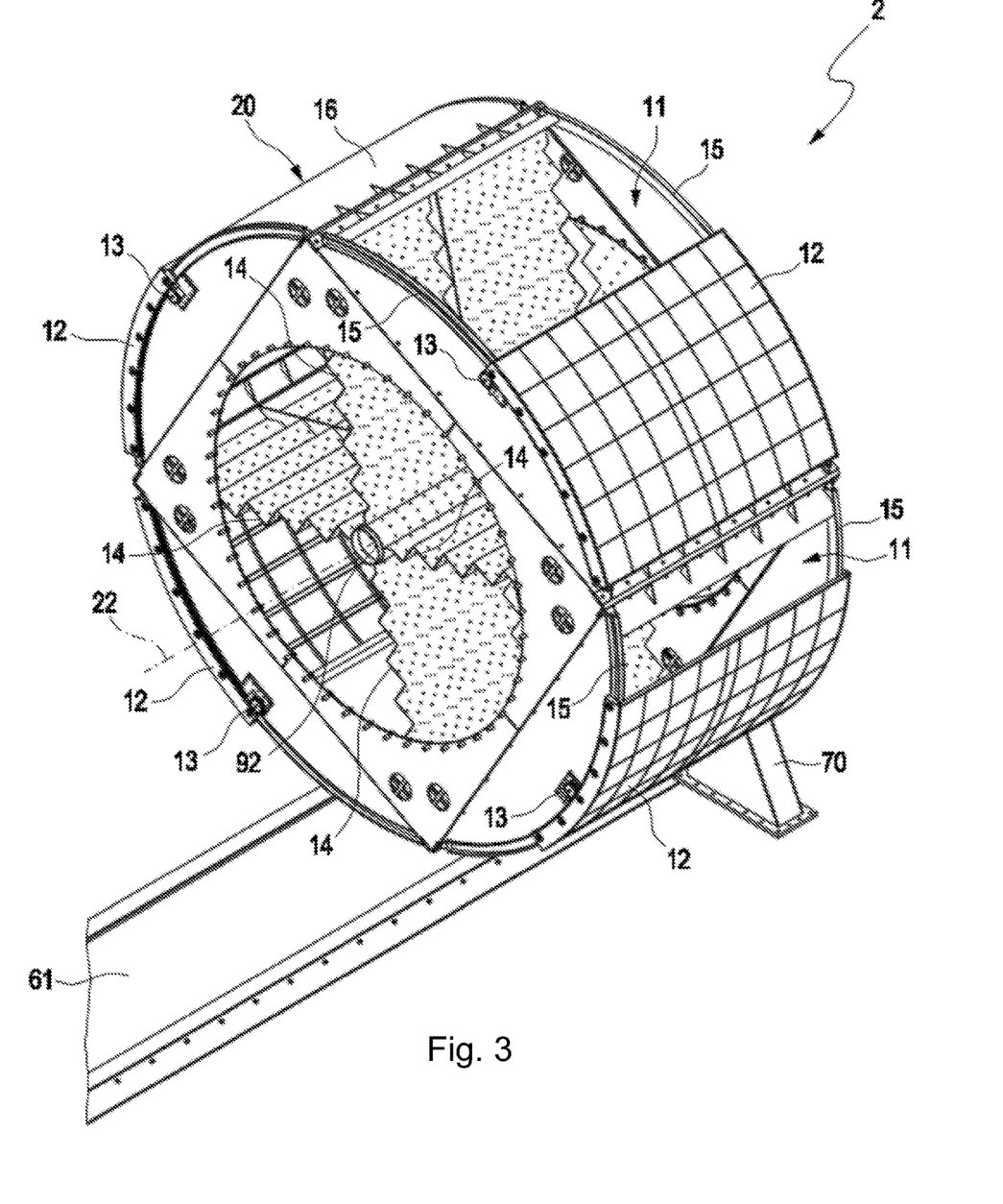
FIG. 3 schematically shows a perspective and partially cut view of a rotting container of a rotting device according to another form of the present disclosure.

FIG. 3 schematically shows a perspective and partially cut view of a rotting container 20 of a rotting device 2 according to another form of the present disclosure. The rotting device 2 differs from the rotting device 1 by not having any chute while the exhausting line 61 is integrated with the platform 70 and extends below the rotting containers 20.

Figure 4:
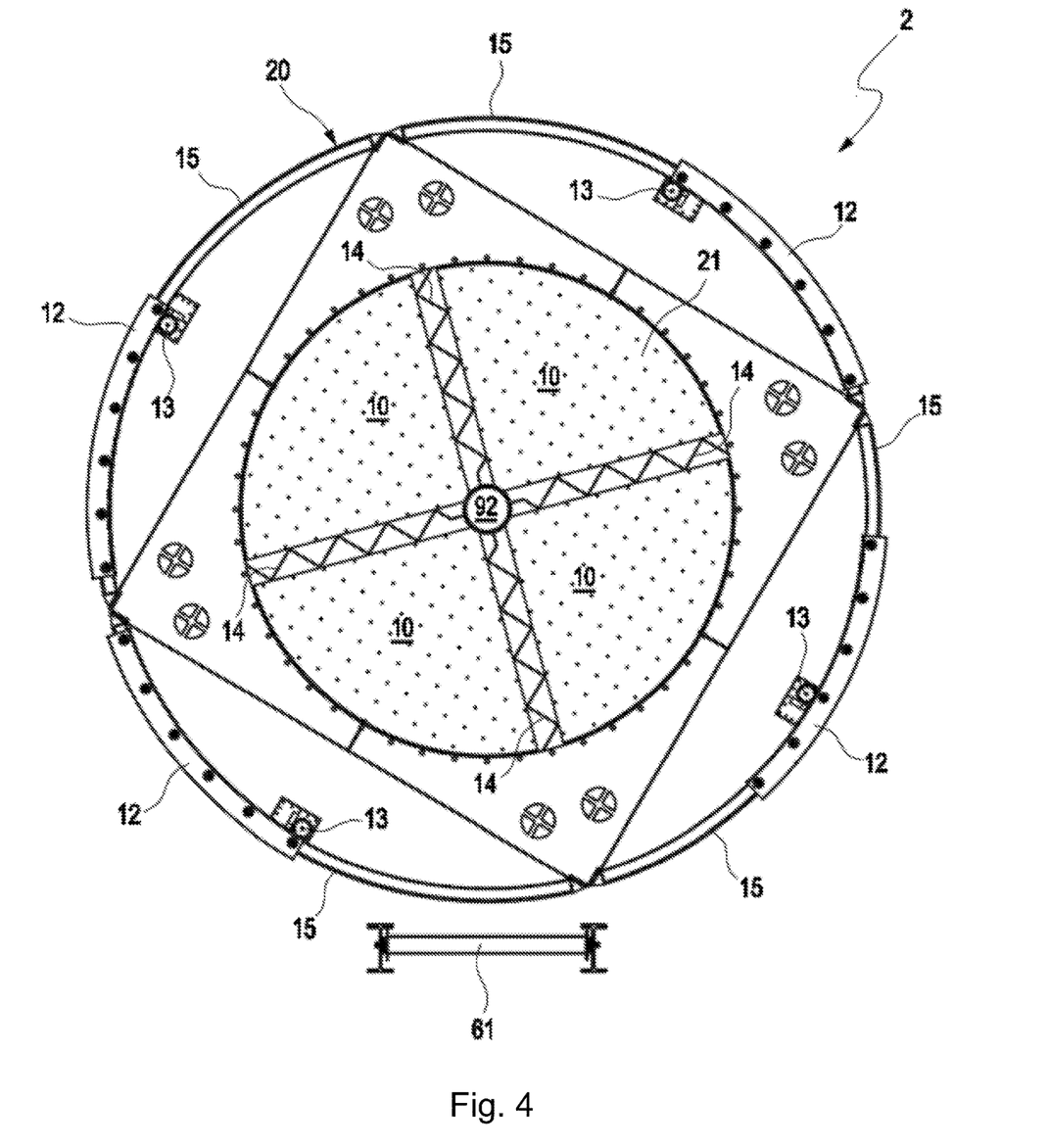
FIG. 4 schematically shows an axial view of the rotting container shown in FIG. 3.

FIG. 4 schematically shows an axial view of the rotting container 20 in FIG. 3. The rotting container 20 has four segments each forming a rotting chamber 10 and spanning a right peripheral angle and, correspondingly, four perforated segment walls 14. In some variations the segment walls 14 have zig-zag structures or steps with respect to the radial direction and extending in the axial direction.

Figure 5:
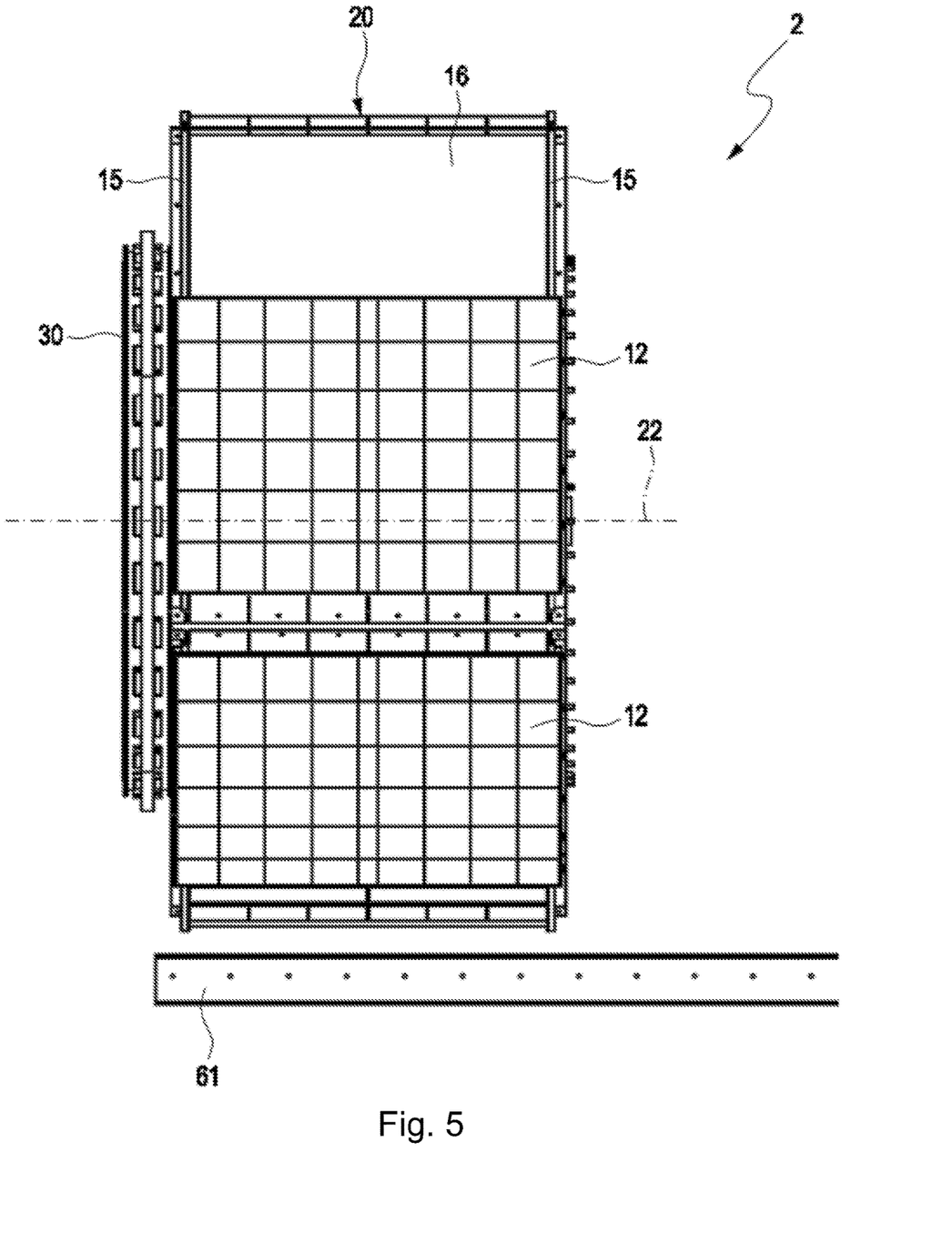
FIG. 5 schematically shows a lateral view of the rotting container shown in FIG. 3.

FIG. 5 schematically shows a lateral view of the rotting container 20 in FIG. 3. The chamber drive unit 30 may have an external peripheral gear rotatably fixed to the rotting container 20 and provided in a connecting section of the rotting container 20 and an electric motor which are rotationally coupled to each other by one or more of a planetary gear, a worm gear, a spur gear, among others.

Figure 6:
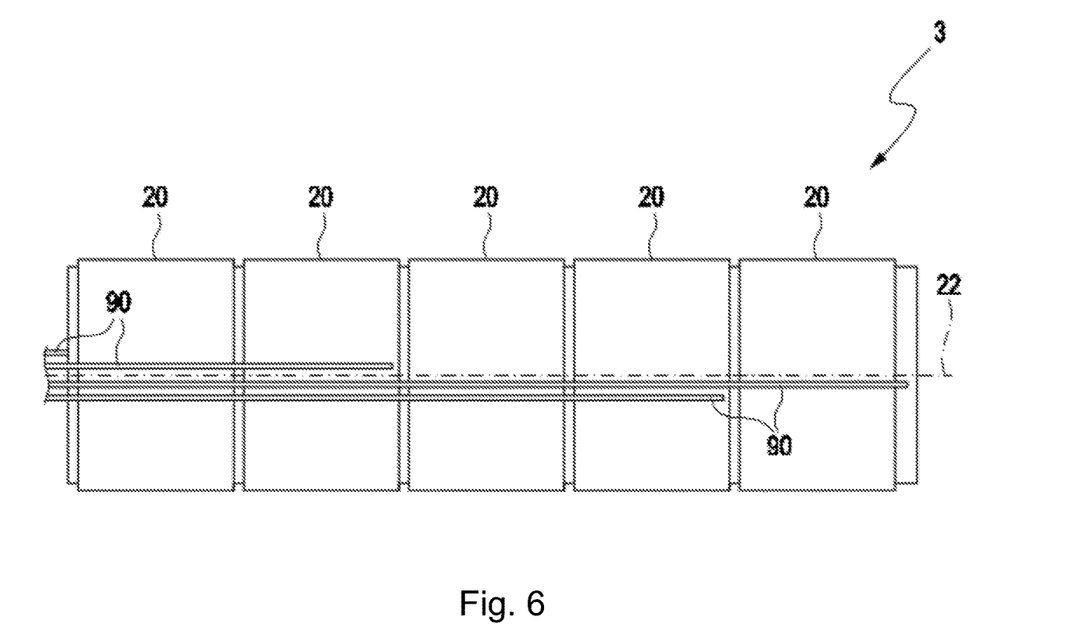
FIG. 6 schematically shows a radial partial view of a rotting device according to still another form of the present disclosure.

FIG. 6 schematically shows a lateral partial view of a rotting device 3 according to still another form of the present disclosure. The rotting device 3 differs from the rotting devices 1, 2 by having five containers 20 instead of two containers. The water conduits 90 extend in the axial direction 22 of the rotting device 3 and at a distance to the rotational axis and end at different axial positions.

During operation of the rotting device 1 the control unit 40 automatically controls execution of the following steps for each rotting chamber 10 of the rotting device 1.

First, the control unit 40 operates the chamber drive unit 30 in order to turn the rotting containers 20 positioning the rotting chamber 10 such that the port 11 of the rotting chamber 10 faces upwards in a direction opposite to gravity. Then, the control unit 40 operates the cover drive unit 13 of the rotting device 1 associated with the rotting chamber 10 for traveling (moving) back the cover 12 thus opening the port 11. Next, the control unit 40 operates the feeding line drive unit 53 in order to convey an organic material being contained in the feeding funnel 52 via the feeding line 51 and to feed it (e.g., automatically feed it) into the rotting chamber 10. When the organic material is fed into the rotting chamber 10 and/or the rotting chamber 10 is filled up (i.e., full), the control unit 40 operates the feeding line drive unit 53 in order to stop the feeding line 51. After that, the control unit 40 operates the cover drive unit 13 to move the cover 12 and thereby close the port 11.

In another step, the organic material is rotted in the rotting chamber 10 for a rotting time. The control unit 40 operates the chamber drive unit 30 alternately halting and turning the rotting chamber 10 by halting and turning the rotting container 20, respectively. The rotting chamber 10 is halted for a halting time in a range from 1 hour to 2 hours, for example for a time of 1.5 hours, and the rotting chamber 10 is turned during a turning time by a turning angle in a range from 225° to 315°, for example by a turning angle of 270°.

In some variations of the present disclosure, during the halting time, the rotting chamber 10 is intermediately turned by a turning angle in a range from 45° to 135°. e.g., by a turning angle of 90° when a temperature of the organic material measured by the temperature sensor 80 associated to the rotting chamber 10 exceeds a predefined temperature, e.g., 70° C.

During the rotting time the control unit 40 operates the air supply unit 93 or the water supply unit 91 to supply air to the rotting chamber 10 via the air conduit 92 or to supply water to the rotting chamber 10 via the water conduit 90 in case the temperature sensor 80, the humidity sensor 81, the oxygen sensor 82 or the pH sensor 83 associated to the rotting chamber 10 signals a respective measured value to be outside of a respective predetermined range of values.

In some variations of the present disclosure, the rotting time is completed when a temperature of the organic material measured by the temperature sensor 80 associated with the rotting chamber 10 reaches a peak of 70° C. and stays at a temperature in a range from 55° C. to 65° C., e.g., a temperature of 60° C., for at least an hour after having reached the peak temperature of 70° C.

After the rotting time the rotted organic material is automatically exhausted from the rotting chamber 10. The control unit 40 operates the chamber drive unit 30 in order to turn the rotting container 20 having the rotting chamber 10 such that the port 11 of the rotting chamber 10 faces downwards in a gravity direction. Next, the control unit 40 operates the exhausting line drive unit 63 in order to convey an organic material via the exhausting line 61. Then, the control unit 40 operates the cover drive unit 13 of the rotting device 1 associated to the rotting chamber 10 for traveling back the cover 12 thus opening the port 11. The rotted organic material in the rotting chamber 10 exits the rotting chamber 10 and falls, particularly via the chute 62, onto the exhausting line 61, the exhausting line 61 conveying the rotted organic material from the rotting device 1 to an external container (not shown). When the rotting chamber 10 is completely emptied, the control unit 40 operates the cover drive unit 13 for traveling forth the cover 12 thus closing the port 11. After that, the control unit 40 operates the exhausting line drive unit 63 in order to stop the exhausting line 61.

The skilled person appreciates that the rotting device 1 and the rotting method carried out by the rotting device 1, thus, allow for different rotting stages in the rotting chambers 10 and, consequently, for automatically rotting a plurality of charges of organic material independently from each other.

The skilled person understands that variations according to the present disclosure neither are to have all the features described herein or to have the exact feature combinations described herein nor are limited to the features described herein. Rather, features of the variations may be added, omitted or combined differently without departing from the teachings of the present disclosure.

In this application, the term "module", "control unit" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The devices and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

REFERENCE NUMERALS 1 rotting device
2 rotting device
3 rotting device
10 rotting chamber
11 port
12 cover
13 cover drive unit
14 perforated segment wall
15 rail
16 peripheral wall
20 rotting container
21 perforated container wall
22 axial direction
30 chamber drive unit
40 control unit
50 feeding unit
51 feeding line
52 feeding funnel
53 feeding line drive unit
54 feeding unit rack
55 slope adjusting unit
60 exhausting unit
61 exhausting line
62 chute
63 exhausting line drive unit
70 platform
80 temperature sensor
81 humidity sensor
82 oxygen sensor
83 pH sensor
90 water conduit
91 water supply unit
92 air conduit
93 air supply unit
100 circuitry

What is claimed is:

1. A method for rotting an organic material, the method comprising: rotting an organic material in at least one pivoted rotting chamber of a rotting device for a rotting time, the rotting device comprising a control unit and a chamber drive unit, wherein the chamber drive unit is alternatively halting and turning the at least one pivoted rotting chamber during the rotting time and wherein, during the turning of the at least one pivoted rotting chamber, the at least one pivoted rotting chamber turns by a turning angle in a range from 225° to 315°, and wherein the control unit operates a cover drive unit of the rotting device for feeding the organic material into a port and exhausting the organic material from the port, the cover drive unit traveling back and forth a cover of the at least one pivoted rotting chamber thus opening and closing the port of the at least one rotting chamber.

2. The method according to claim 1, wherein the rotting chamber is fed when the port of the rotting chamber faces in a direction opposite to gravity and the rotting chamber is exhausted when the port of the rotting chamber faces in a direction towards gravity.

3. The method according to claim 1, wherein the rotting chamber is halted for a halting time in a range from 1 hour to 2 hours and turned during a turning time by the turning angle of 270°.

4. The method according to claim 1, wherein, during the halting of the at least one pivoted rotting chamber, the rotting chamber is turned by a turning angle in a range from 45° to 135° when a temperature of the organic material measured by a temperature sensor associated with and arranged within the rotting chamber exceeds 70° C.

5. The method according to claim 1, wherein the organic material is exhausted from the rotting chamber when a temperature of the organic material measured by a temperature sensor associated with and arranged within the rotting chamber reaches 70° C. and stays at a temperature in a range from 55° C. to 65° C. for at least an hour after reaching 70° C.

6. The method according to claim 1, wherein, during the halting of the at least one pivoted rotting chamber, the rotting chamber is turned by a turning angle in a range from 45° to 135° when a temperature of the organic material measured by a temperature sensor associated with and arranged within the rotting chamber exceeds 70° C. and the organic material is exhausted from the rotting chamber when the temperature of the organic material measured by the temperature sensor reaches 70° C. and stays at a temperature in a range from 55° C. to 65° C. for at least an hour after reaching 70° C.

7. The method according to claim 1, wherein the rotting chamber is automatically fed via a feeding line of a feeding unit and the rotting chamber is automatically exhausted via an exhausting line of an exhausting unit.

8. The method according to claim 1, wherein the rotting chamber is automatically exhausted via an exhausting line of an exhausting unit.

* * * * *